United States Patent
Ise

(10) Patent No.: US 7,551,212 B2
(45) Date of Patent: Jun. 23, 2009

(54) IMAGE PICKUP APPARATUS FOR CLAMPING OPTICAL BLACK LEVEL TO A PREDETERMINED LEVEL

(75) Inventor: Makoto Ise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 614 days.

(21) Appl. No.: 11/231,108

(22) Filed: Sep. 20, 2005

(65) Prior Publication Data
US 2006/0061668 A1 Mar. 23, 2006

(30) Foreign Application Priority Data
Sep. 22, 2004 (JP) ............................. 2004-275652

(51) Int. Cl.
*H04N 9/64* (2006.01)
*H04N 5/217* (2006.01)
(52) U.S. Cl. ...................................... 348/243; 348/241
(58) Field of Classification Search ................ 348/241, 348/251, 243, 607; 382/270, 274
See application file for complete search history.

(56) References Cited

U.S. PATENT DOCUMENTS

| 4,001,502 | A | * | 1/1977 | van Roessel | 348/637 |
| 4,473,839 | A | * | 9/1984 | Noda | 348/692 |
| 4,742,392 | A | * | 5/1988 | Hashimoto | 348/695 |
| 4,816,917 | A | * | 3/1989 | Yamamoto et al. | 348/257 |
| 4,970,594 | A | * | 11/1990 | Kitaura et al. | 348/697 |
| 5,010,395 | A | * | 4/1991 | Tsuji et al. | 348/71 |
| 5,221,963 | A | * | 6/1993 | Hashimoto et al. | 348/234 |
| 5,296,929 | A | * | 3/1994 | Morimoto | 348/607 |
| 5,341,218 | A | * | 8/1994 | Kaneko et al. | 348/695 |
| 5,448,306 | A | * | 9/1995 | Koyama | 348/678 |

FOREIGN PATENT DOCUMENTS

| JP | 04258093 A | * | 9/1992 |
| JP | 09247552 A | * | 9/1997 |
| JP | 2003-143488 | * | 5/2003 |

* cited by examiner

*Primary Examiner*—Ngoc-Yen T Vu
(74) *Attorney, Agent, or Firm*—Canon U.S.A., Inc., IP Division

(57) ABSTRACT

An image pickup apparatus includes an imaging device configured to convert an optical image of an object into an electrical signal, an optical black level extraction unit configured to extract an optical black level included in an image signal obtained by photoelectric conversion by the imaging device, a blanking level extraction unit configured to extract a blanking level in a blanking period of the image signal, an abnormality detection unit configured to detect an abnormality of the optical black level, and a clamp unit configured, at a normal time when the abnormality is not detected by the abnormality detection unit, to clamp the optical black level to a first target value with the optical black level extracted by the optical black level extraction unit as a reference, and at an abnormal time when the abnormality is detected by the abnormality detection unit, to clamp the optical black level to a second target value with the blanking level extracted by the blanking level extraction unit as a reference.

6 Claims, 9 Drawing Sheets

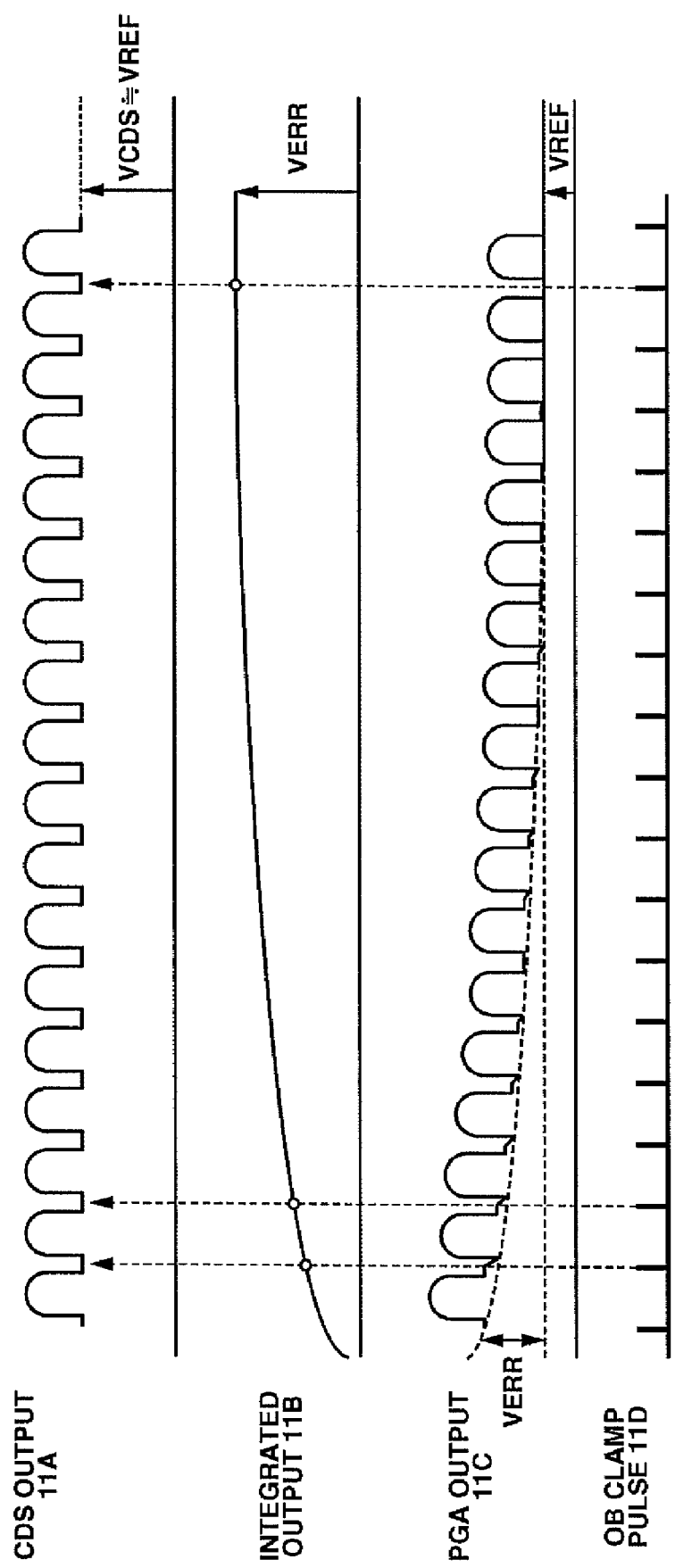

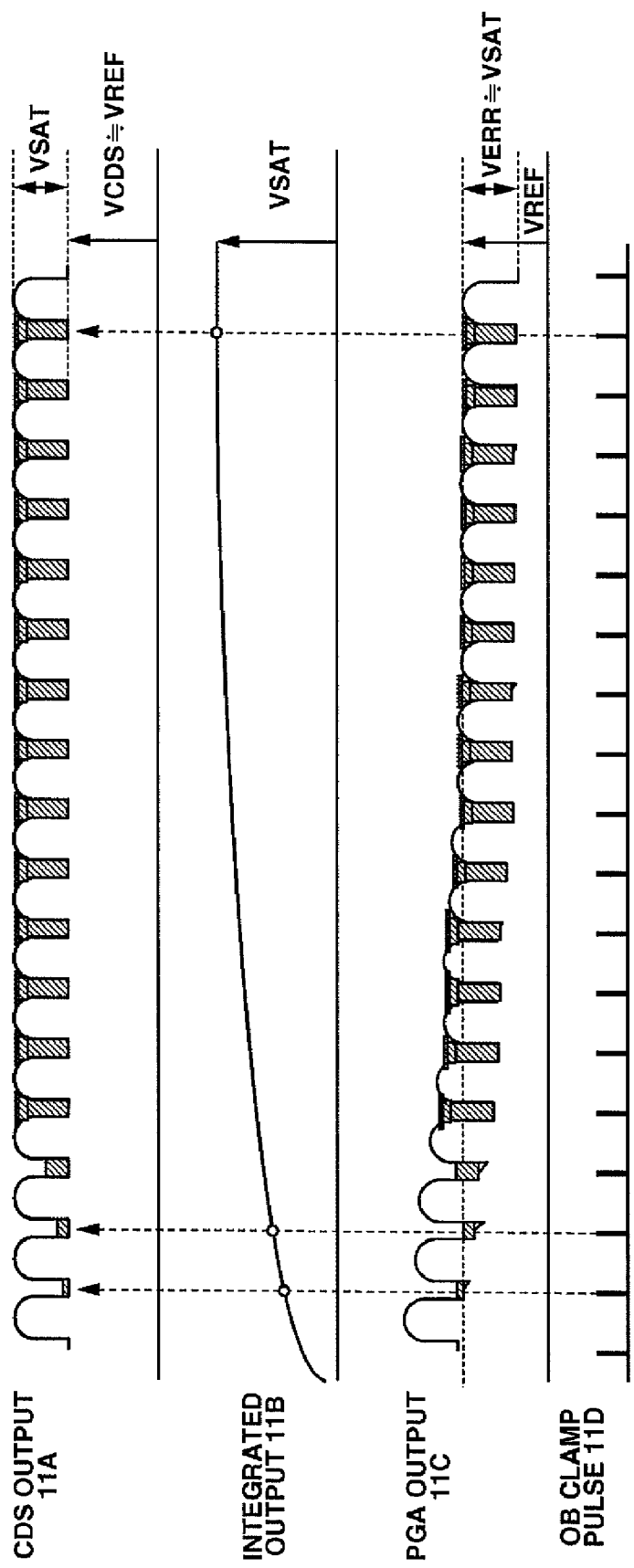

IMAGE PICKUP APPARATUS FOR CLAMPING OPTICAL BLACK LEVEL TO A PREDETERMINED LEVEL

BACKGROUND OF THE INVENTION

1. Field of the Invention

The present invention relates to an image pickup technology, and more particularly to an image pickup apparatus and an image pickup method for clamping an optical black level to a predetermined level.

2. Description of the Related Art

Conventionally, in displaying and recording a still image and a motion picture picked up by a solid-state imaging device such as a CCD, an optical black (hereafter referred to as OB) level of the imaging device is utilized as a reference of luminance level of an image signal. OB refers to a pixel output shaded within a photo detection pixel portion of the imaging device and not dependant on an incident light.

One example of a device configuration of a feedback clamp DC component recovery (clamp) circuit using the OB level as a black reference of the image signal, which is commonly utilized in a video camera and the like, is shown in FIG. 7. A main operating waveform thereof is shown in FIG. 8, to briefly explain the operation.

In FIG. 7, first, a solid-state imaging device 101 such as a CCD is provided. The image signal outputted from the solid-state imaging device 101 is inputted to a circuit 102 called a CDS (correlative double sampling) circuit and a reset noise is removed there from. After that, the image signal inputted to the CDS circuit 102 is inputted to an offset adder circuit 103 and a predetermined offset voltage is added to the image signal. Then, the offset addition result is inputted to a variable amplifier 104.

The CDS circuit 102 utilizes a predetermined reference voltage VREF inputted by a terminal 106 as a reference of a feed-through part of the image signal, and the variable amplifier 104 constitutes a direct current amplifier which similarly utilizes the reference voltage VREF as a reference of direct current amplification of the image signal.

The variable amplifier 104 is a gain varying unit configured to correct unevenness of an output sensing degree of the CCD 101 and switch a sensitivity setting of the image pickup apparatus. Hereafter, in order to simply and clearly explain about a clamping operation of the image pickup apparatus, the gain is simply handled at a level of only one time.

An amplified output signal from the variable amplifier 104 is, on one hand, inputted to a circuit for processing, recording, and displaying the image (not shown). On the other hand, the amplified output signal from the variable amplifier 104 is inputted to a sample-hold circuit 107 and an OB level sample-held by an OB clamp pulse which is synchronized with a reading timing of an OB pixel inputted from a terminal 109 is inputted to an integration amplifier 105

The integration amplifier 105 has a predetermined integrated time constant configured by a capacitor 105b and a resistance 105c. The integration amplifier 105 has a configuration of a feedback control in which a difference voltage (clamp error voltage) between the sample-held OB level and a predetermined reference voltage VREF inputted from a terminal 106 is integrated in the integrated time constant; and the output (amount of deviation from the voltage VREF (error signal)) is inputted to the offset adder circuit 103 as a subtraction value and is subtracted therein.

FIG. 8 shows a state in which the OB level of an output signal 11C of the variable amplifier 104 is clamped and converged to a current voltage level VREF, and shows an operating waveform of each portion at that time.

A signal waveform 11A is an output waveform of the CDS circuit 102. The signal waveform 11A has an OB pixel output of a predetermined period per one horizontal line read from the imaging device 101. A timing signal which sample-holds a part of the OB pixel output period is an OB clamp pulse 11D.

An OB pixel output of the signal waveform 11A retains a direct voltage relatively close to the reference voltage VREF, by an operation of the CDS (correlative double sampling) circuit 102. However, in actuality, the OB pixel output of the signal waveform 11A has an offset error (of several mV to several tens mV in an ordinary case) because a difference component (CCD offset) between a feed through component and a signal component of the imaging device 101 and a dark current component depending on a temperature of the imaging device are superposed.

The offset error is uneven in each imaging device and fluctuates depending on the temperature. This offset error is amplified by the variable amplifier 104 and is finally outputted as a black level fluctuation VERR of the image signal.

The black level fluctuation VERR is detected and integrated by the sample-hold circuit 107 and the integration amplifier 105 as a difference of the VREF voltage, and is outputted as an integrated output signal 11B (ΔVERR) as shown in FIG. 8, and is subtracted from the output signal 11A of the CDS circuit 102.

By repeating the operation each time an OB clamp pulse 11D is outputted, the integrated output ΔVERR is converged to the black level fluctuation VERR just as shown by the signal waveform 11B, and the OB pixel output of the output signal of the variable amplifier 104 is converged to the reference voltage VREF as shown by the signal waveform 11C.

In the feedback OB clamp circuit like this, an integration time constant in the case of negative feedback of the black level fluctuation VERR by integration is important.

That is, if the time constant is short, follow-up response to the VREF voltage of the output OB level per one horizontal line becomes faster. However, along with that, the amount of fluctuation (frequency of fluctuation) per clamping operation also becomes larger. As a result, a noise in the shape of horizontal stripe can easily occur.

In this regard, the time constant must be set at a predetermined length of time so that the noise in the shape of horizontal stripe does not become a problem in terms of the image quality.

In Japanese Laid-Open Patent Publication No. 2003-143488, the image pickup apparatus for performing clamping processing on the basis of the signal from an optical black region is disclosed.

In the conventional feedback OB clamp circuit like this, the offset error caused by a CCD offset component and a dark current component of the imaging device are considered to be the main cause of the amount of fluctuation of OB. Accordingly, the conventional feedback OB clamp circuit is designed focusing on correcting the offset error components.

Primarily, the offset error component is not so large, being 1/10 or less (several mV to several tens mV) of the full range (up to 1V) of the image signal.

When a strong light such as direct sunlight is incident on the solid-state imaging device such as CCD, a so-called "blooming" phenomenon occurs, that is, electric charges are overflowed in a photoelectric conversion section. When the blooming occurs, there is a case where the overflowed electric charges flow also into the OB pixel portion which is primarily shaded within a photo detection pixel portion and is not dependant on the incident light, and is accumulated therein.

In this case, the OB level cannot be utilized as the correct and precise black reference unlike the offset error component described above. Moreover, the OB level in this case rapidly reaches the level of full range (CCD saturation level VSAT) fluctuation of the image signal in the intense blooming.

FIG. 9 is a view showing the operating waveform of each portion for explaining the clamp operation at the time of occurrence of the blooming. The OB output of the CDS output 11A rapidly reaches the CCD saturation level VSAT as the blooming occurs. The OB output of the CDS output 11A rapidly reaches a CCD saturation level VSAT in accordance with the occurrence of the blooming phenomenon. The OB output of the variable amplifier output 11C is slowly reduced to the reference voltage VREF, in relation to the inaccurate OB level raised to the CCD saturation level VSAT, in a response time with the time constant set by the integration amplifier 105.

Thus, in the configuration of the conventional clamp circuit, there has been a problem in that the image signal follows up the inaccurate black level which deviates substantially from the appropriate OB level when the blooming occurs and that the whole image signal is subject to blacking.

In addition, as a result of following up to the inaccurate black level deviating substantially from the appropriate OB level, it takes very long to return to the normal OB level after the blooming of the imaging device has been cancelled and the blacking continues during the restoration time.

SUMMARY OF THE INVENTION

The present invention is directed to an image pickup apparatus capable of preventing blacking of an image occurring due to blooming and capable of restoring an image to a normal image at a high speed.

In one aspect of the present invention, an image pickup apparatus includes an imaging device configured to convert an optical image of an object into an electrical signal, an optical black level extraction unit configured to extract an optical black level included in an image signal obtained by photoelectric conversion by the imaging device, a blanking level extraction unit configured to extract a blanking level in a blanking period of the image signal, an abnormality detection unit configured to detect an abnormality of the optical black level, and a clamp unit configured, at a normal time when the abnormality is not detected by the abnormality detection unit, to clamp the optical black level to a first target value with the optical black level extracted by the optical black level extraction unit as a reference, and at an abnormal time when the abnormality is detected by the abnormality detection unit, to clamp the optical black level to a second target value with the blanking level extracted by the blanking level extraction unit as a reference.

In another aspect of the present invention, an image pickup method includes the steps of photo electrically converting an optical image of an object into an electrical signal, extracting an optical black level included in an image signal obtained by photoelectric conversion, extracting a blanking level in a blanking period of the image signal, detecting an abnormality of the optical black level, and at a normal time when the abnormality is not detected, clamping the optical black level to a first target value with the extracted optical black level as a reference, and at an abnormal time when the abnormality is detected, clamping the optical black level to a second target value with the extracted blanking level as a reference.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a view showing the operating waveform of each portion explaining an ordinary operation of the conventional example.

FIG. 9 is a view showing the operating waveform of each portion explaining an operation of the conventional example when a problem has occurred.

DETAILED DESCRIPTION OF THE EMBODIMENTS

Embodiments of the invention will be described in detail below with reference to the drawings.

First Embodiment

Figure 1:
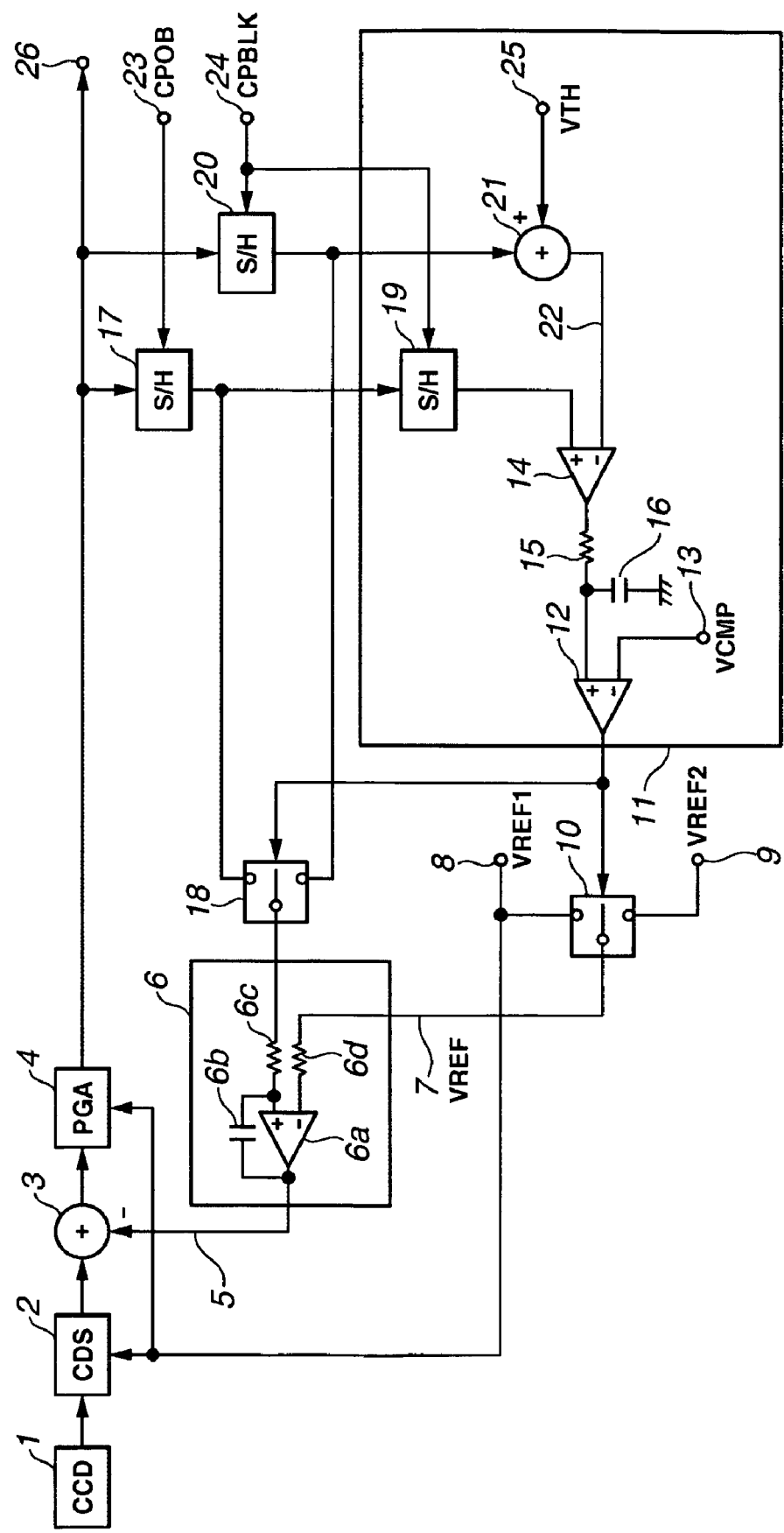
FIG. 1 is a block diagram of a first embodiment of the present invention.

FIG. 1 is a block diagram showing an example of a configuration of a feedback OB clamp circuit according to a first embodiment of the present invention.

First, the configuration of FIG. 1 is explained. Reference numeral 1 denotes a CCD (CCD image sensor: an imaging device) for converting an optical image of an object into an electrical signal. After the image signal outputted from the CCD 1 is inputted to a circuit 2 called CDS (correlated double sampling) and a reset noise is removed there from, the image signal is inputted to an offset adder circuit 3 and a predetermined offset (direct current) voltage is added to the image signal, and then an offset addition result is inputted to a variable amplifier 4. The variable amplifier 4 amplifies the image signal by a predetermined gain or a variable gain.

The CDS circuit 2 constitutes a CDS circuit which has a predetermined reference voltage VREF1 inputted by a terminal 8 as a reference of a feed-through part of the image signal, and in the same way, the variable amplifier 4 constitutes a direct current amplifier which has the reference voltage VREF1 as a reference of direct current amplification of the image signal.

The variable amplifier 4 is a gain varying unit configured to correct unevenness of an output sensing degree of the CCD 1 and to switch a sensitivity setting of the image pickup apparatus. Hereafter, in this embodiment, in order to simply and clearly explain about a clamping operation of the image pickup apparatus, the gain is simply handled at a level of only one time.

An amplified output signal from the variable amplifier 4 is inputted from a terminal 26 to a circuit for processing, recording, and displaying the image (not shown). The amplified output signal from the variable amplifier 4 is also inputted to a sample-hold circuit 17, and a sample-held OB level is inputted to a selector 18 by an OB pulse CPOB which is synchronized with a reading timing of an OB pixel inputted from a terminal 23.

The amplified output signal from the variable amplifier 4 is inputted to a sample-hold circuit 20 and a sample-held blanking level is inputted to the selector 18 by a blanking pulse CPBLK which is synchronized with a blanking timing inputted by the terminal 24.

An output selected by the selector 18 is inputted to a positive pole of an integration amplifier 6.

The integration amplifier 6 has a predetermined integrated time constant configured by a capacitor 6B and a resistance 6C. The integration amplifier 6 has a configuration of a feedback control in which a difference voltage (clamp error voltage) between the sample-held OB level and a predetermined reference voltage VREF inputted from a signal line 7 is integrated in the integrated time constant, and the output (amount of deviation from the voltage VREF) is inputted to the offset adder circuit 3 as a subtraction value and is subtracted therein.

A circuit 11 for detecting an abnormality of a black level is configured of a sample-hold circuit 19, an offset adding device 21, comparators 12 and 14, and a primary integration device (a resistance 15 and a capacitor 16).

The sample-held blanking level, together with the sample-held OB level, is inputted to the circuit 11 for detecting an abnormality of the black level.

In the circuit 11 for detecting an abnormality of the black level, the inputted blanking level is shifted, via the offset adding device 21, at a predetermined voltage VTH which is inputted to the offset adding device in the same way, and then the blanking level is inputted to a negative pole of the comparator 14.

On the other hand, the OB level and the blanking level are compared to each other in relation to their levels by inputting the OB level sample-held by the sample-hold circuit 17 to the positive pole of the comparator 14 after being resampled by the blanking pulse CPBLK, which is synchronized with the blanking timing inputted from the terminal 24. The output from the comparator 14 is inputted to the positive pole of the comparator 12 via a primary integration device configured of the resistance 15 and the capacitor 16. A compared voltage VCMP is inputted to the negative pole of the comparator 12, and the output signal of the comparator 12 is finally inputted to a switching control terminal of the selector 18 and a selector 10, as a result of the detection by the circuit 11 which detects the abnormality of the black level.

The direct voltages VREF1 and VREF2, which are references to the black level, are provided to the selector 10. Depending on the result of detection by the circuit 11, which detects the abnormality of the black level, the reference voltage is switched to either one of the direct voltages VREF1 and VREF2, and is inputted to the negative pole of the integration amplifier 6, as the reference voltage of the integration amplifier 6.

The detection by the circuit 11, which detects the abnormality of the black level, is at a low level in an ordinary state, and in that case, the connection is established so that the OB level sample-held from the amplified output signal from the variable amplifier 4 is selected by the selector 18, and the selected OB level is supplied as a voltage to be integrated in the integration amplifier 6.

In addition, the connection is established so that the voltage VREF 1, which is the same as the reference voltage supplied to the CDS circuit 2 and the variable amplifier 4, is selected by the selector 10. The selected voltage VREF1 is supplied as the reference voltage VREF of the integration amplifier 6. Thus, the clamp operation is performed with the direct voltage level VREF as a target voltage of the OB level.

In an ordinary state, a manner in which the OB level of an amplified output signal 1D from the variable amplifier 4 is clamped and converged to the direct voltage level VREF (VREF=VREF1) is the same as the conventional example shown in FIG. 8, and accordingly, it is not shown here.

An OB pixel output of the CDS output 1A retains a direct voltage relatively close to the reference voltage VREF by an operation of the CDS (correlative double sampling) circuit 2. However, in actuality, a difference component (CCD offset) between the feed through component of a CCD1 and the signal component and a dark current component depending on the temperature of the imaging device are superposed. Accordingly, the OB pixel output of the CCD output has an offset error (of several mV to several tens mV in an ordinary case).

The offset error is uneven in each imaging device and fluctuates depending on the temperature. Besides, the offset error is amplified by the variable amplifier 4 and is finally outputted as a black level fluctuation VERR of the image signal.

The black level fluctuation VERR is detected and integrated by the sample-hold circuit 17 and the integration amplifier 6, respectively, as a difference of the VREF voltage, and is outputted as an integrated output signal 1C. The amount of deviation from the voltage VREF of the output 1C is subtracted from an output signal 1A of the CDS circuit 2.

In this way, by repeating the operation each time an OB clamp pulse 1E is outputted, the integrated output 1B and the OB pixel output of the output signal of the variable amplifier 4 are converged to the reference voltage VREF.

Next, the clamp operation according to this embodiment when the blooming occurs is now explained.

Figure 2:
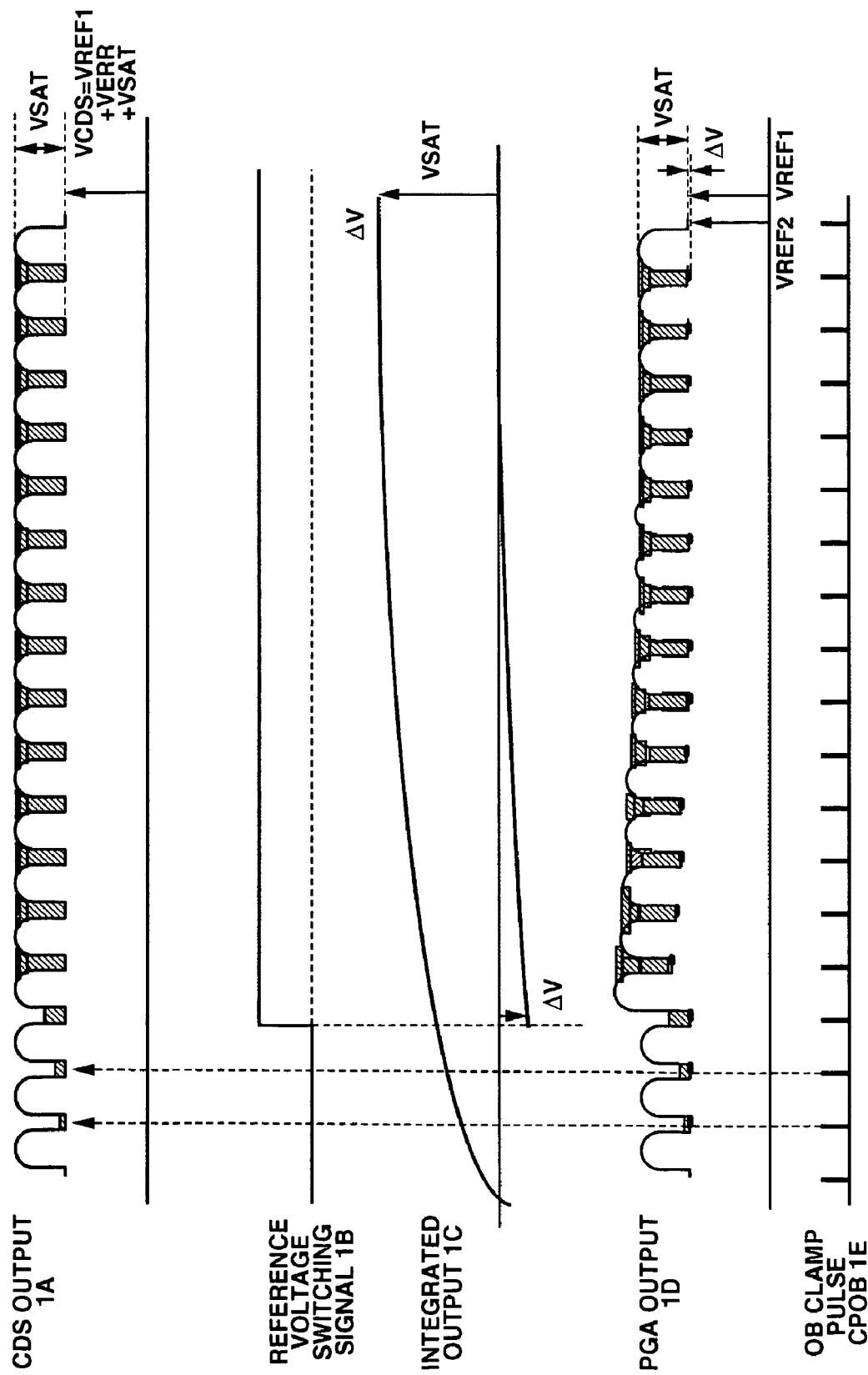
FIG. 2 is a view showing an operating waveform of each portion explaining the operation according to the first embodiment of the present invention.

FIG. 2 shows an operating waveform of each portion in order to explain the clamp operation according to this embodiment when the blooming occurs.

The OB output of the CDS output 1A is rapidly raised together with the occurrence of the blooming phenomenon and reaches a CCD saturation level VSAT. The OB output of the variable amplifier output 1D first begins to rise in accordance with the rise in the OB output of the CDS output 1A. Then, the OB output of the variable amplifier output is inputted to the integration amplifier 6 via the sample-hold circuit 17, and operates so that the OB level of the raised CDS output 1A is slowly reduced to the reference voltage VREF1, in a response time with the time constant set by the integration amplifier 6.

However, with regard to the OB output which has been rapidly raised to the CCD saturation level VSAT, the circuit 11 for detecting the abnormality of the black level detects the abnormality of the black level, and the level of the output becomes high; and the reference voltage VREF is switched by the selector 10 to the voltage VREF2 for the abnormal state from the voltage VREF1 for the normal state.

Figure 3:
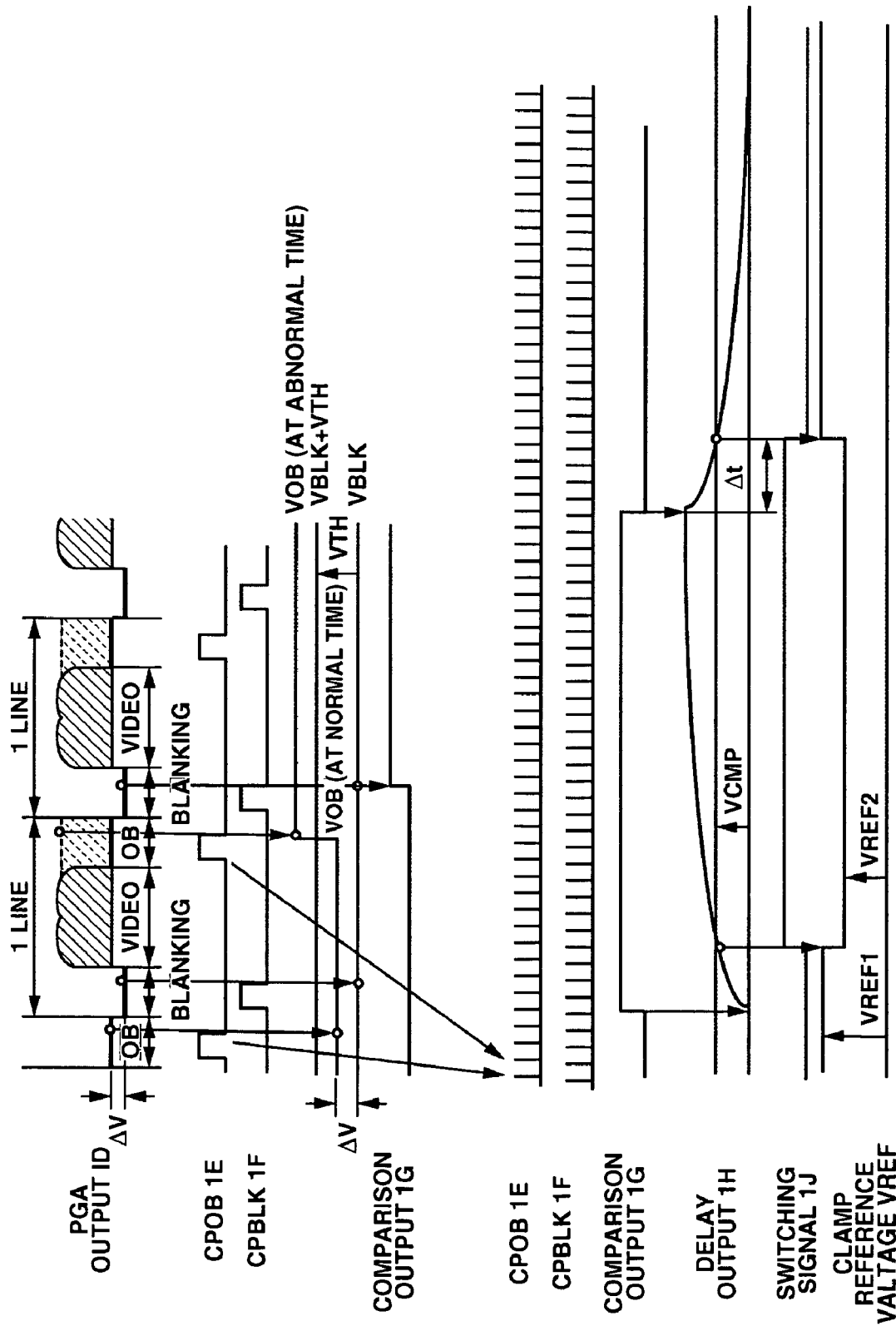
FIG. 3 is a view showing the operating waveform of each portion explaining the operation according to the first embodiment of the present invention.

FIG. 3 shows an operating waveform of each portion for explaining the detection operation by the circuit 11 for detecting the abnormality of the black level at that time. FIG. 3 shows the exact manner in which the blooming occurs due to strong light incident on the CCD and a signal level fluctuates up to the CCD saturation level VSAT over both a signal reading period and the OB period.

The variable amplifier output 1D schematically shows a state of the image signal by one line unit. The signals per one horizontal line are approximately constituted by the blanking period, a video reading period, and the OB period. The blanking period is a period in which the reading of the pixel signal from the CCD is suspended.

With regard to the variable amplifier output 1D, the signal level of the OB period is rapidly raised to the CCD saturation level VSAT from the primary black level due to the blooming phenomenon, just as the signal level of the video reading period.

In the blanking period in which the reading of the pixel from the CCD is not performed, there occurs no effect of the blooming.

However, even when an OB level VOB is at the primary black level when no blooming phenomenon occurs, the blanking level VBLK has a predetermined potential difference $\Delta V$ between itself and the OB level VOB.

There is a case in which $\Delta V$ is given a negative sign, however, in this embodiment, a case where $\Delta V=VOB-VBLK$ and VBLK<VOB is explained.

The variable amplifier output 1D is sample-held by the OB pulse CPOB (1E) and, immediately after that, the OB level VOB which is again sample-held with the blanking pulse CPBLK (1F) is changed from the primary black level kept up to that time to the CCD saturation level VSAT.

On the other hand, with regard to the variable amplifier output 1D, the black level VBLK which has been sample-held by the blanking pulse CPBLK (1F) shows almost no change and the output of the offset adding device 21 also holds a constant level (VBLK+VTH).

In ordinary cases, considering the potential difference $\Delta V$ between VBLK and VOB, an appropriate threshold voltage level VTH is set so that a comparison level is inverted between the OB level VOB and (VBLK+VTH) only after the black level fluctuation completely deviating from the black level fluctuation VERR of the image signal occurs.

Accordingly, in this case where VOB=VSAT, VSAT is inputted to the positive pole of the comparator 14 and (VBLK+VTH) is inputted to the negative pole of the comparator 14. Then the output 1G of the comparator 14 is inverted to the high level from the low level at the timing of the blanking pulse CPBLK (1F). The output 1G of the comparator 14 remains at the high level until the OB level VOB of the PGA output signal 1D returns to a primary OB level after the blooming phenomenon is cancelled.

Further, the output 1G of the comparator 14 is supplied to the comparator 12 via the primary integration device constituted by the resistance 15 and the capacitor 16, and is compared to the predetermined comparison voltage VCMP in the comparator 12. The time constant of the integration device and the comparison voltage VCMP are set so that the output 1G of the comparator 14 reaches exactly the voltage VCMP when the output 1G of the comparator 14 keeps holding the high level for a period corresponding to a predetermined horizontal lines or more (in ordinary cases, several lines to several tens lines). Thereby, only after the output 1G of the comparator 14 holds the high level, the output 1G is transmitted to an output 1J of the comparator 12 as a detection output of the circuit 11 which detects the abnormality of the black level.

This is intended, for example, to prevent the circuit 11 which detects the abnormality of the black level from giving the detection output by mistake, too sensitively responding to the OB fluctuation for a very short period caused by the switchover of the gain by the variable amplifier and the like.

As described above, the black level abnormality detection circuit 11 detects the black level fluctuation occurring in accordance with the blooming phenomenon, and the reference voltage VREF is switched to VREF2 for the abnormal state from the voltage VREF1 for the normal state. Besides, at the same time, as the reference for the black level of the clamp operation, the OB level VOB of the output signal of the variable amplifier 4 kept up to that time is switched to the blanking level VBLK.

The voltage VREF2 is set at a voltage level lower than the voltage VREF1 by $\Delta V$. Upon switchover of the reference voltage VREF of the integration amplifier 6 from the voltage VREF1 to VREF2, the blanking output of the output signal of the variable amplifier 4 converges to VREF2, instead of to the target voltage VREF1.

In other words, with regard to the integrated output 1C, by switching over the target value from VREF1 to VREF2, before an error voltage VSAT is outputted from the primary correct OB level following the wrong OB level VSAT, the output is reduced by $\Delta V$, as shown in FIG. 2; and VBLK is clamped at the voltage level lower than the primary OB level just by $\Delta V$ (VREF2). Therefore, the image signal is clamped and converged to an appropriate black level. Accordingly, even when the OB level is at an abnormal level, blacking of the image signal can be reduced enough.

After the blooming phenomenon of the CCD has been cancelled, the variable amplifier output 1D is raised to the reference voltage VREF1 by voltage fluctuation $\Delta V$, in relation to the primary correct OB output level. Accordingly, by appropriately setting the voltage $\Delta V$, the required time in which the image signal returns to the correct OB output level after having been clamped can be shortened.

For example, when $\Delta V$ sufficiently smaller than the CCD saturation level VSAT (=VOB–VBLK) is used, the amount of blooming and the restoration time can be greatly reduced, in proportion to the clamp fluctuation voltage $\Delta V$, when the blooming occurs.

As described above, the black level abnormality detection circuit 11 detects the abnormality in the amount of fluctuation deviating from the optical black level which occurs due to the unevenness of the imaging device 1 and the temperature characteristics. On the basis of the result of detection by the black level abnormality detection circuit 11, at the normal time, the optical black level is clamped to the first target value VREF1 using the optical black level extracted by the sample-hold circuit 17 as the reference. However, at the abnormal time, the optical black level is clamped to the second target value VREF2 using the blanking level extracted by the sample-hold circuit 20 as the reference.

More specifically, on the basis of the result of detection by the black level abnormality detection circuit 11, at the normal time, the error signal between the optical black level extracted by the sample-hold circuit 17 and the first target value VREF1 is detected. However, at the abnormal time, the error signal between the blanking level extracted by the sample-hold circuit 20 and the second target value VREF2 is detected. The detected error signal is used as a negative feedback signal which is subtracted by the offset adding section 3 from the electrical signal after photoelectric conversion by the imaging device 1. Thus, the optical black level of the image signal is clamped to a predetermined voltage.

The second target value VREF2 is set on the basis of the difference in the level between the optical black level extracted by the sample-hold circuit 17 and the blanking level extracted by the sample-hold circuit 20. The first target value VREF1 and the second target value VREF2 are set in accordance with an amplification degree of the variable amplifier 4.

In this embodiment, in order to simply explain the basic operation of the clamp, a gain setting of the variable amplifier 4 is defined at a level of one time. However, considering that an offset correction amount at the offset adder circuit 3 is multiplied by a gain times in accordance with the gain setting of the variable amplifier 4, the appropriate ΔV voltage is determined in consideration of a gain setting value.

In accordance with the variable amount of the variable amplifier 4, the appropriate reference voltages VREF1 and VREF2 of the black level can be provided in plurality and individually as a table reference value, and can be switched from time to time.

Second Embodiment

The feedback OB clamp circuit shown in the first embodiment is configured to feed back the output signal of the variable amplifier. In this regard, while image pickup equipments are recently digitalized, the A/D converter is often and generally provided in the post-stage of the variable amplifier and utilized to feed back the digital output thereof.

The configuration and operation according to the second embodiment of the present invention are arranged so that, also in relation to a digital feedback OB clamp circuit, the blacking due to fluctuation in the OB level at the time of occurrence of the blooming can be suppressed and the clamp restoration time to the normal OB level after the cancellation of the blooming can be shortened.

Figure 4:
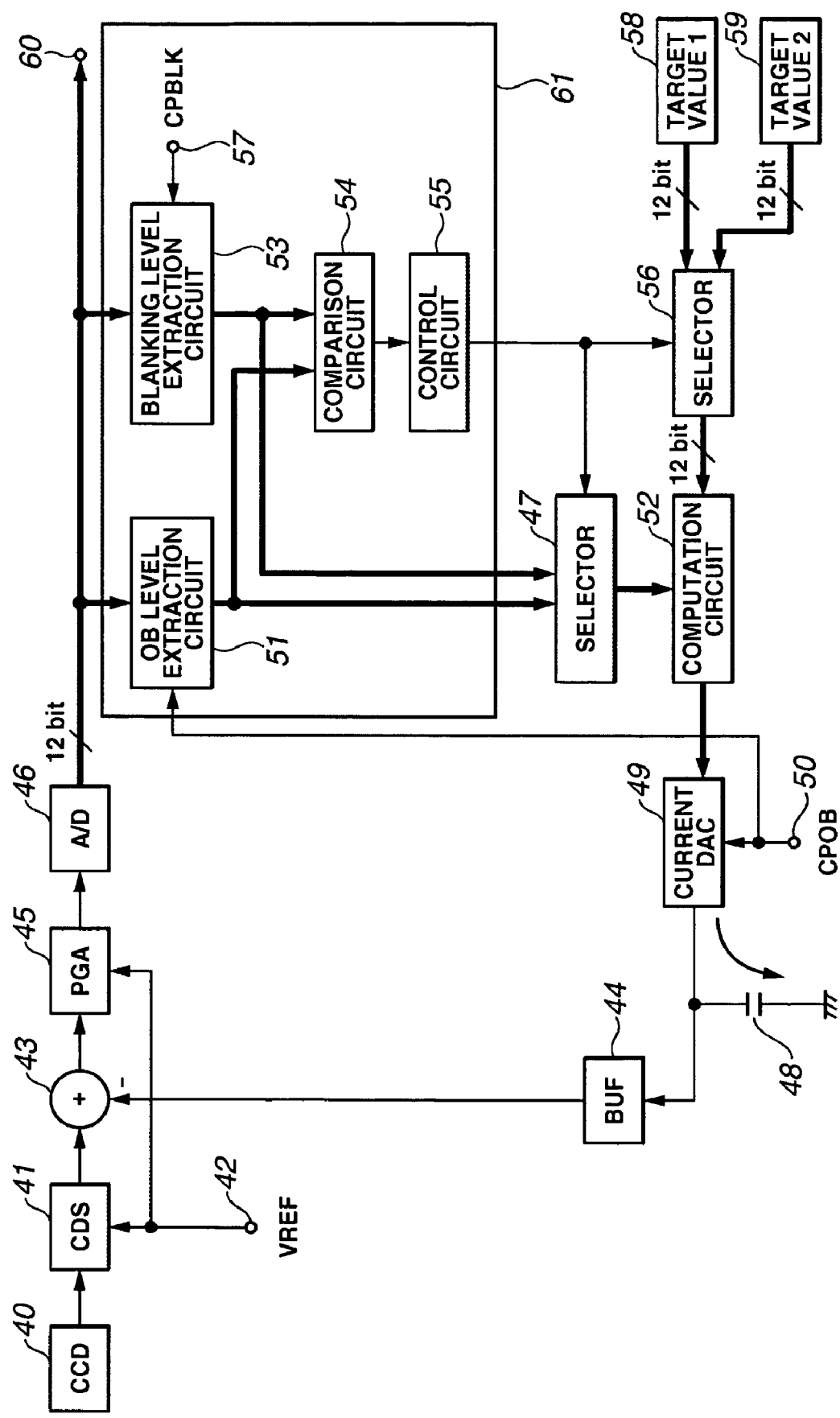
FIG. 4 is a block diagram of a second embodiment of the present invention.

FIG. 4 is a block diagram showing an example of the second embodiment of the present invention.

The configuration of FIG. 4 is explained below. Reference numeral 40 denotes a CCD (CCD image sensor) for converting the optical image of the object into the electrical signal. The image signal outputted from the CCD 40 is inputted to a CDS (correlated double sampling) circuit 41. In the CDS circuit 41, the reset noise is eliminated from the image signal. After that, the image signal is inputted to an offset adder circuit 43 and the predetermined offset voltage is added thereto. The offset addition result is inputted to a variable amplifier 45.

The CDS circuit 41 has a predetermined reference voltage VREF inputted from a terminal 42 as a reference of a feed-through part of the image signal. In the same way, the variable amplifier 45 is a direct amplifier which has the reference voltage VREF as a reference of direct current amplification of the image signal.

The variable amplifier 45 is a gain varying unit configured to correct unevenness of output sensing degree of the CCD 40 and to switch a sensitivity setting of the image pickup apparatus.

The amplified output signal from the variable amplifier 45 is inputted to an A/D converter 46 and is converted from the analog image signal into the digital image signal. The image signal converted into the digital signal is, on one hand, inputted to a circuit 60 for processing, recording, and displaying the image. The image signal converted into the digital signal is also inputted to an OB level extraction circuit 51. In the OB level extraction circuit 51, the OB level in the OB period included in the digital signal is extracted and inputted to a comparator 54 and a data selector 47.

The digital signal from the A/D converter 46 is also inputted to a blanking level extraction circuit 53. In the blanking level extraction circuit 53, the blanking level in the blanking period included in the digital signal is extracted and inputted to the comparator 54 and a data selector 47.

The comparison result by the comparator 54 is inputted to a control circuit 55. By the output of the comparator 55, the switching of the data of the OB level and the blanking level inputted in the data selector 47 is controlled. At the same time, by the output of the comparator 55, the data switching to the data (register value) 58 and 59 of a black level target value inputted to a data selector 56 is controlled. The switching of data by the data selector 56 and a selected output from the data selector 56 are inputted to a computation circuit 52. In the computation circuit 52, an error computation is performed between the selected black level target value and the selected output from the data selector 47. The output from the computation circuit 52 is converted to an analog current value via a current DAC 49 (D/A converter) and is outputted.

To the OB level extraction circuit 51 and the current DAC 49, the OB clamp pulse CPOB which is synchronized with the reading timing of the OB pixel is inputted from a terminal 50. Thus, the OB level is extracted and the current DAC 49 is driven.

To the blanking level extraction circuit 53, the blanking pulse CPBLK which is synchronized with the reading timing of the OB pixel is inputted from a terminal 57. Thus, the blanking level is extracted.

A circuit 61 for detecting an abnormality of the black level is configured of the OB level extraction circuit 51, the blanking level extraction circuit 53, the comparator 54, and the control circuit 55, and the control output of the control circuit 55 is the detection output.

The DAC 49 has a configuration of a feedback control in which the output of the current DAC 49 is connected to a capacitor 48 whose one end is connected to the ground. By charging and discharging an output current to and from the capacitor 48, the extracted OB error level is integrated with a predetermined time constant configured of the current value and the capacitor 48. The output thereof is inputted to the offset adder circuit 43 as a subtraction value via a buffer circuit 44, and subtraction is performed therein.

A manner in which the OB level of the output signal from the variable amplifier 45 is clamped and converged to the direct voltage level VREF1 in an ordinary state is the same as the conventional example shown in FIG. 8, and accordingly, it is not shown here.

The OB pixel output of a CCD output holds a direct voltage relatively close to the reference voltage VREF, by an operation of the CDS (correlative double sampling) circuit 41. However, in actuality, a difference component (CCD offset) between the feed through component of the CCD and the signal component and a dark current component depending on the temperature of the imaging device are superposed. Accordingly, the OB pixel output of the CCD output has an offset error (of several mV to several tens mV in an ordinary case).

The offset error VERR is uneven in each imaging device and fluctuates depending on the temperature. The offset error is amplified by the variable amplifier 45 and is superposed on the black level of the image signal. The offset error is converted to the digital value by the A/D converter 46 and is outputted.

In an ordinary state, a low level is outputted from the black level abnormality detection circuit 61. The extracted OB level is selected by the data selector 47 and a black level target value 1 is selected by the data selector 56.

The offset error VERR is detected from the digitally converted black level and integrated by the OB level extraction circuit 51, the digital computation circuit 52, the black level target value 1 selected by the data selector 56, and the current DAC 49. The offset error VERR is then outputted as an integrated output signal ΔVERR via the buffer circuit 44 and is subtracted from the output signal of the CDS circuit 41.

By repeating the operation for each output of the OB clamp pulse, the black level fluctuation ΔVERR becomes closer to VERR and the OB output of the CDS circuit 41 becomes closer to the reference voltage VREF1. In response thereto, the OB level after A/D conversion converges to the predetermined target value 1.

Next, the clamp operation at the time of the blooming according to the second embodiment is explained.

The operating waveform of each portion to be used to explain the clamp operation at the time of the blooming is substantially the same as that of FIG. 2 used to explain the first embodiment of the present invention. Accordingly, the operating waveform is described below with reference to FIG. 2, which also refers to a difference between the first embodiment and the second embodiment of the present invention.

The OB output of the signal 1A from the CDS circuit 41 is rapidly raised together with the occurrence of the blooming and reaches a CCD saturation level VSAT. The OB output of the output signal 1D from the variable amplifier 45 first begins to rise together with the rise in the OB output of the CDS output signal 1A. Then, the error from the black level target value 1 is detected and integrated by the A/D converter 46, the OB level extraction circuit 51, the digital computation circuit 52, the black level target value 1 selected by the data selector 56, and the current DAC 49 and is subtracted, as the integrated output signal, from the output of the CDS circuit 41 via the buffer circuit 44. In this process, the output signal 1D from the variable amplifier 45, as the integrated output 1C, operates so that the OB level of the raised CDS output signal 1A is slowly reduced to the reference voltage VREF1, in a response time by the time constant set by the current DAC 49 and the capacitor 48.

However, with regard to the OB output which has been rapidly raised to the CCD saturation level VSAT, the circuit 61 for detecting the abnormality of the black level detects the abnormality of the black level. Then the level of the output becomes high, and the OB level is switched to the blanking level by the data selector 47, and then the black level target value is switched to the target value 2 for the abnormal state from the target value 1 for the normal state by the selector 56.

Figure 5:
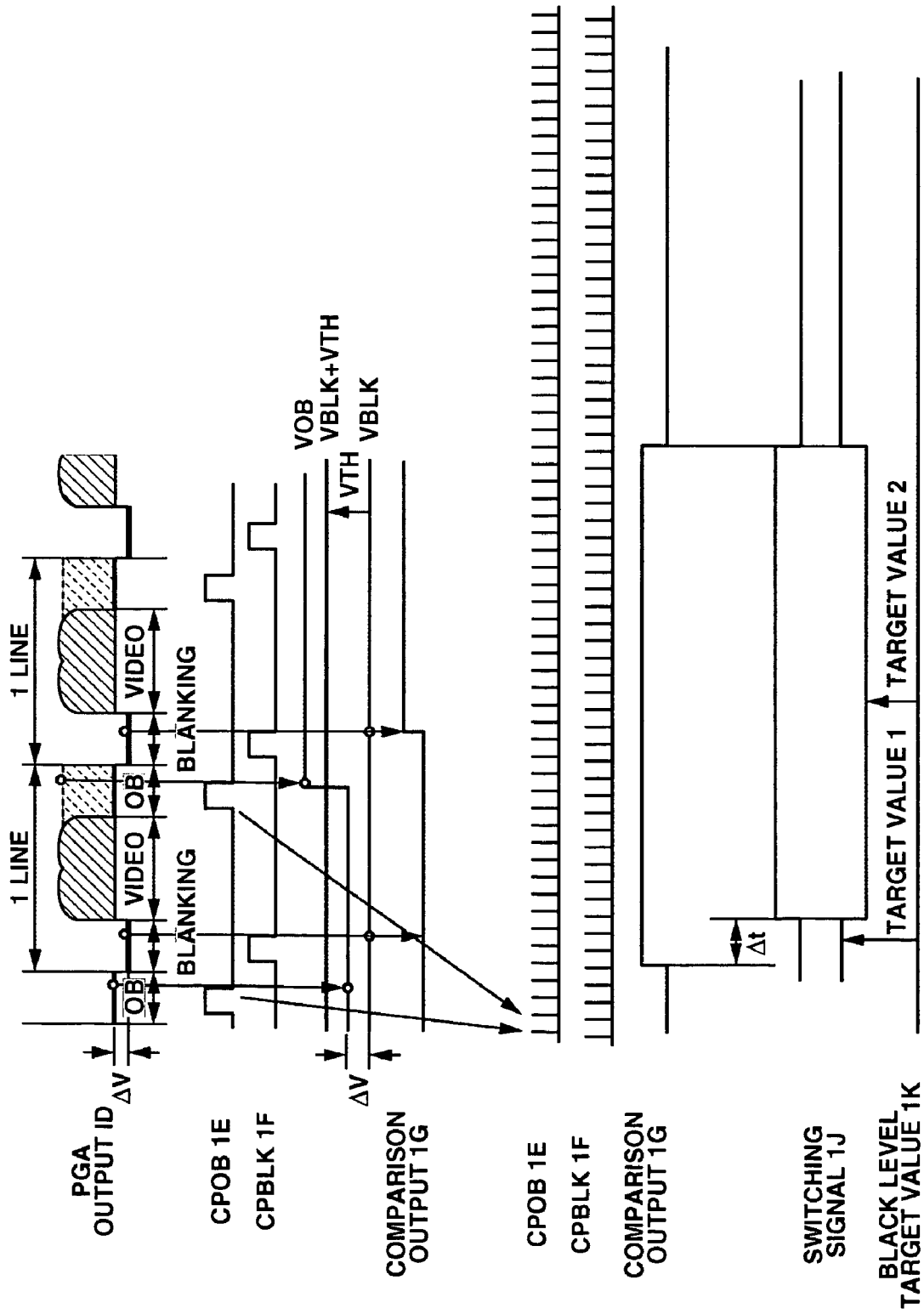
FIG. 5 is a view showing the operating waveform of each portion explaining the operation according to the second embodiment of the present invention.

FIG. 5 shows an operating waveform of each portion for explaining the detection operation by the circuit 61 which detects the abnormality of the black level at the time the blooming occurs.

First, the variable amplifier output 1D schematically shows a state of the image signal by one line unit. The signals per one horizontal line are approximately constituted by the blanking period, a video reading period, and the OB period. The blanking period is a period in which the reading of the pixel signal from the CCD is not performed.

With regard to the variable amplifier output 1D, the signal level in the OB period is rapidly raised to the CCD saturation level VSAT from the primary black level due to the blooming phenomenon, just as the signal level of the video reading period.

In the blanking period in which the reading of the pixel from the CCD is not performed, there occurs no effect of the blooming.

However, even when an OB level VOB is at the primary black level when no blooming phenomenon occurs, the blanking level VBLK has a predetermined potential difference ΔV between itself and the OB level VOB.

There is a case in which ΔV has a negative sign. However, in this embodiment, a case where ΔV=VOB−VBLK and VBLK<VOB is described.

With regard to the output signal of the A/D converter 46, the OB level is extracted by the OB level extraction circuit 51 during a period in which the OB pulse CPOB (1E) is at a high level. The output OB level VOB of the OB level extraction circuit 51 is changed from the primary black level to the CCD saturation level VSAT. The extracted OB level is retained during a period in which the OB pulse CPOB (1E) is at a low level.

On the other hand, with regard to the output signal of the A/D converter 46, the blanking level is extracted by the blanking level extraction circuit 53 during a period in which the blanking pulse CPBLK (1F) is at a high level. The output VBLK of the blanking level extraction circuit 53 does not substantially change. The extracted blanking level is retained during a period in which the blanking pulse CPBLK (1F) is at a low level.

In the comparator 54, comparison computation is performed between the inputted blanking output VBLK and the OB level VOB.

In ordinary cases, considering the potential difference ΔV between VBLK and VOB, an appropriate threshold voltage level VTH is set in advance so that a comparison level is inverted between the OB level VOB and the blanking level VBLK only after the fluctuation occurs in the black level completely deviating from a black level fluctuation VERR of the image signal.

Then, during a period in which the blanking pulse CPBLK (1F) is at the high level, the OB level VOB and the (blanking level VBLK+VTH) are compared to each other in relation to their levels.

In the ordinary state, OB is smaller than (VBLK+VTH) (that is, OB<VBLK+VTH), and a comparison result 1G is a low-level output in relation to the control circuit 55. In addition, when the blooming to the OB section occurs, OB is greater than (VBLK+VTH) (that is, OB>VBLK+VTH), and the comparison result 1G is a high-level output in relation to the control circuit 55.

Therefore, in this case (VOB=VSAT), the comparison result 1G, during the period in which the blanking pulse CPBLK (1F) is at the high level, is inverted from the low level to the high level. In addition, the comparison result 1G is retained at the high level until the OB level VOB of the variable amplifier output 1D returns to the primary OB level after the blooming phenomenon is cancelled.

The output of the controlling circuit 55, namely the output 1J of the black level abnormality detection circuit 61, in response to the result of the comparison result 1G, is inverted from the low-level to the high level when the comparison result 1G holds the high level for a predetermined period of time. In addition, the output of the controlling circuit 55 holds the high level until the OB level VOB of the variable amplifier output 1D returns to the primary OB level after the cancellation of the blooming phenomenon and reaches the low level immediately after the comparison result 1G turns the low level.

This is intended, for example, to prevent the circuit 61 which detects the abnormality of the black level from giving the detection output by mistake, too sensitively responding to the OB fluctuation of a very short period caused by the switchover of the gain by the variable amplifier, and the like.

As described above, the black level abnormality detection circuit 61 detects the black level fluctuation occurring in accordance with the blooming phenomenon, and the black level target value is switched to the target value 2 for the abnormal state from the target value 1 for the normal state. At the same time, with respect to the reference for the black level of the clamp operation, the OB level VOB of extracted from the output signal of the A/D converter 46 kept up to that time is switched to the blanking level VBLK.

Thereby the integrated output 1C outputted from the buffer circuit 44 is switched to the target value 2 (the voltage VREF2) for the abnormal state from the target value 1 (VREF1) for the normal state.

The voltage VREF2 is set at the voltage level lower than the voltage VREF1 by ΔV. The black level target value (reference voltage VREF) of the computation circuit 52 is switched from the target value 1 (voltage VREF1) to the target value 2 (VREF2), and the blanking output of the output signal of the variable amplifier 4 converges to the target value 2 (VREF2), instead of the target value 1 (voltage VREF1).

In other words, with regard to the integrated output 1C, the target value is switched from VREF1 to VREF2, before an error voltage VSAT is outputted following the wrong OB level VSAT instead of the primary correct OB level, and the output is reduced by ΔV, as shown in FIG. 2. VBLK is clamped at the voltage level lower than the primary OB level exactly by ΔV (VREF2). Therefore, the image signal is clamped and converged to an appropriate black level. Accordingly, even when the OB level is at an abnormal level, blacking of the image signal can be reduced enough.

After the blooming phenomenon has been cancelled, the variable amplifier output 1D is raised this time to the reference voltage VREF by the voltage fluctuation ΔV, in relation to the primary correct OB output level. Accordingly, by appropriately setting the voltage ΔV, the required time in which the image signal returns to the correct OB output level after having been clamped can be shortened.

For example, if ΔV sufficiently smaller than the CCD saturation level VSAT (=VOB−VBLK) is used, when the blooming occurs, the amount of blooming and the restoration time can be greatly suppressed in proportion to the clamp fluctuation voltage ΔV.

The target value 1 and the target value 2 are set on the bottom voltage corresponding to a digital lower-limit of the A/D converter 46 and the difference in the level between the optical black level extracted by the OB level extraction circuit 51 and the blanking level extracted by the blanking level extraction circuit 53.

The clamp fluctuation voltage ΔV and clamp convergence time, in the case of circuits adopting digital feedback clamp method via the digital value as in this embodiment, cannot be simply determined only by the amount of voltage fluctuation of the black level in an analog region.

Figure 6:
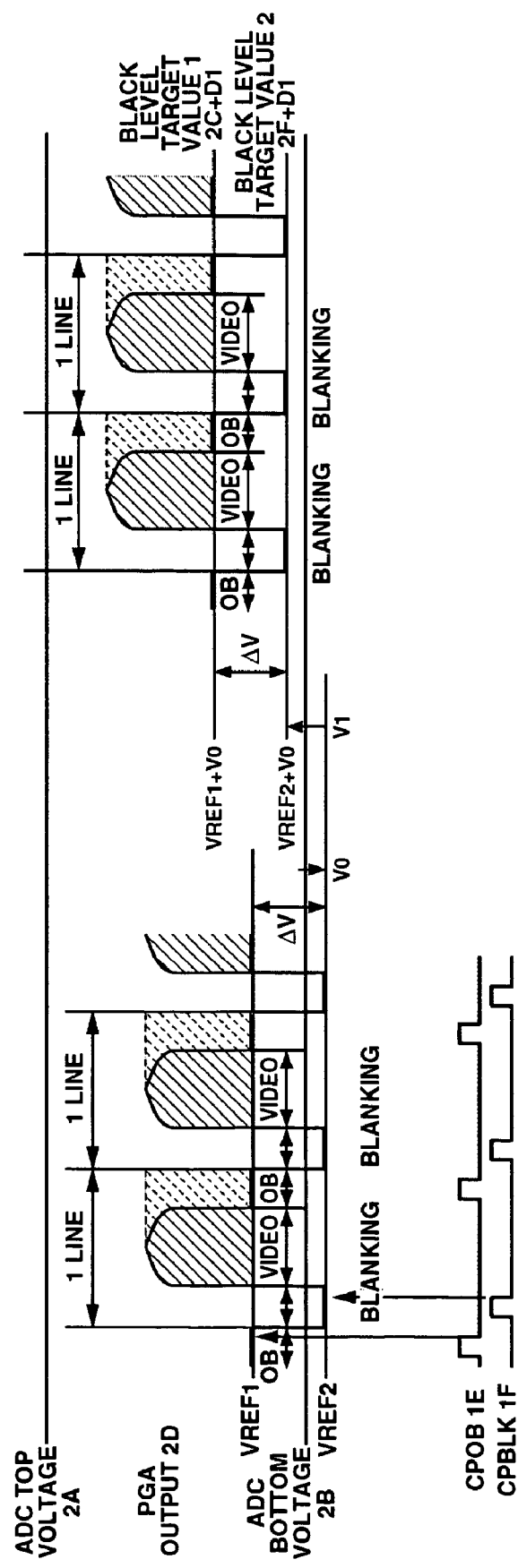
FIG. 6 is a view showing the operating waveform of each portion explaining the operation according to the second embodiment of the present invention.
Figure 7:
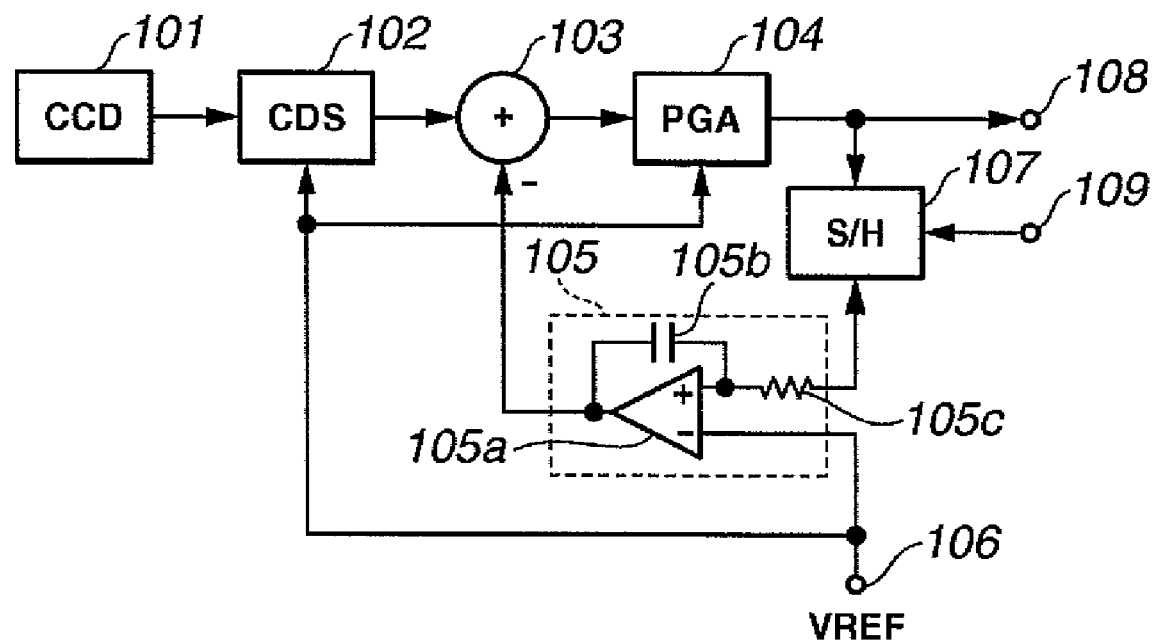
FIG. 7 is a block diagram of a conventional example.

FIG. 6 is a view showing a correspondence between an analog value and the digital value of the image signal with regard to a clamping waveform of the image signal when the OB level fluctuates due to the blooming.

With regard to a variable amplifier output 2D (the input of the A/D converter 46) and a bottom voltage 2B corresponding to the digital lower-limit (zero) of the A/D converter 46, if the blanking level is below a bottom voltage 2B, all the results become zero. Accordingly, the analog voltage cannot be expressed properly in the digital value.

In other words, with regard to the target value 2 which defines the blanking level, if the level obtained by subtracting ΔV (i.e. an A/D conversion value equivalent thereto) from the target value 1 which defines the correct OB level is below the digital lower-limit (zero) of the A/D converter 46, the target value 2 becomes the digital lower-limit (zero). As a result, at the time when the OB level is abnormal, the black level is clamped and converged to a value lower than the value at the normal time by the amount of shortage (V0) below the digital lower-limit (zero) (blacking of the level V0 occurs).

In addition, in this case, immediately after the abnormality of the OB level due to the blooming has been detected, an amount of restoration cannot be fed back correctly because ΔV is reduced by the amount of shortage below the bottom voltage 2B, and clamp convergence time is elongated.

A method for preventing this is possible in which the range of ΔV is limited so that ΔV cannot possibly be below the bottom voltage 2B. However, the higher the degree of amplification becomes, the more difficult it becomes to take a countermeasure because ΔV increases in proportion to the degree of amplification of the variable amplifier 45.

In this regard, a countermeasure is taken in this embodiment to prevent the level obtained by subtracting ΔV (i.e. an A/D conversion value equivalent thereto) from the target value 1 from being below the digital lower-limit (zero) of the A/D converter 46. Namely, a predetermined offset data D1 is provided to the black level target value 1 and the black level target value 2 when the OB level abnormality is detected. In addition, the offset data D1 is subtracted in the circuit 60 for processing, recording, and displaying the image, which is disposed at a post-stage thereof, and the appropriate black level without blacking can be obtained.

Note that in this embodiment, in order to simply explain the basic operation of the clamp, the gain setting of the variable amplifier 45 is defined at a level of one time. However, since the offset correction amount at the offset adder circuit 43 is multiplied by a gain in accordance with the gain setting of the variable amplifier 45, the appropriate ΔV voltage is determined considering the gain setting value.

Moreover, in accordance with the variable amount of the variable amplifier 45, the appropriate black level target values 1 and 2 of the black level may be provided in plurality and individually as a table reference value, and can be switched from time to time.

Note that in the first and the second embodiments of the present invention, in order to contrast their configuration with the conventional example, the signal processing is configured in the order of the imaging device, the CDS circuit, the offset adding device, and the gain variable amplifier, while using the configuration of the conventional example as their base. However, the subject matter of the present invention is such that the offset adding device is restrained, that is, feedback restriction is performed to the negative feedback signal which substantially deviates from unevenness and temperature characteristics of the device of the image pickup unit and the amount of fluctuation by an amplification unit. Accordingly, on the basis of the subject matter of the present invention, the order is not necessarily limited to the configuration as described above.

As can easily be understood from the above discussion, according to the first and the second embodiments, it is possible to obtain the image signal without the blackness occurring in the image signal following the black level considerably deviating from the OB output even if the OB level fluctuation considerably deviates from the appropriate level occurs in the CCD output. This is because the detection unit configured to detect the abnormality of the optical black level is provided and a clamp unit of the OB level is selected at the normal time and the clamp unit of the blanking level is selected at the abnormal time, on the basis of the result of the detection by the detection unit.

In addition, because it is possible to immediately return to the normal OB level even after the blooming of the CCD has been cancelled, an image signal of excellent response can be obtained.

The present invention may include an embodiment in which computer-executable process steps that perform the same functions according to the embodiments described above are provided to a system or a device including a computer.

While the present invention has been described with reference to exemplary embodiments, it is to be understood that the invention is not limited to the disclosed exemplary embodiments. The scope of the following claims is to be accorded the broadest interpretation so as to encompass all such modifications, equivalent structures, and functions.

This application claims priority from Japanese Patent Application No. 2004-275652 filed Sep. 22, 2004, which is hereby incorporated by reference herein in its entirety.

What is claimed is:

1. An image pickup apparatus comprising:
   an imaging device configured to convert an optical image of an object into an electrical signal;
   an optical black level extraction unit configured to extract an optical black level included in an image signal obtained by photoelectric conversion by the imaging device;
   a blanking level extraction unit configured to extract a blanking level in a blanking period of the image signal;
   an abnormality detection unit configured to detect an abnormality of the optical black level; and
   a clamp unit configured to clamp the optical black level to a first target value at a normal time when the abnormality is not detected by the abnormality detection unit, and to clamp the optical black level to a second target value at an abnormal time when the abnormality is detected by the abnormality detection unit;
   wherein the clamp unit comprises:
      an offset adding unit configured to add a predetermined direct voltage to the image signal obtained by photoelectric conversion by the imaging device; and
      an error signal detection unit configured to detect an error signal between the optical black level extracted by the optical black level extraction unit and the first target value at the normal time, and to detect an error signal between the blanking level extracted by the blanking level extraction unit and the second target value at the abnormal time,
   wherein the optical black level extraction unit and the blanking level extraction unit extract the optical black level and the blanking level, respectively, included in the image signal subjected to a direct voltage adding processing by the offset adding unit, and
   wherein the optical black level of the image signal is clamped to a predetermined voltage by using the detected error signal as a negative feedback signal for subtraction by the offset adding unit from the image signal obtained by photoelectric conversion by the imaging device.

2. The image pickup apparatus according to claim 1, further comprising:
   an A/D conversion unit configured to convert an analog image signal subjected to the direct voltage adding processing by the offset adding unit into a digital image signal,
   wherein the optical black level extraction unit and the blanking level extraction unit extract the optical black level and the blanking level included in the digital image signal, respectively.

3. The image pickup apparatus according to claim 2, wherein the first target value and the second target value are set on the basis of a bottom voltage corresponding to a digital lower limit of the A/D conversion unit and of a difference in level between the optical black level extracted by the optical black level extraction unit and the blanking level extracted by the blanking level extraction unit.

4. The image pickup apparatus according to claim 1, wherein the optical black level extraction unit and the blanking level extraction unit are sample-hold units configured to sample-hold an analog image signal.

5. The image pickup apparatus according to claim 1, wherein the second target value is set on the basis of a difference in level between the optical black level extracted by the optical black level extraction unit and the blanking level extracted by the blanking level extraction unit.

6. The image pickup apparatus according to claim 1, wherein the error signal detection unit detects the error signal with a predetermined integration time constant in relation to a fluctuation of the optical black level included in the image signal at the normal time.

* * * * *